US011526632B2

United States Patent
Hampel et al.

(10) Patent No.: US 11,526,632 B2
(45) Date of Patent: Dec. 13, 2022

(54) SECURING ADDRESS INFORMATION IN A MEMORY CONTROLLER

(71) Applicant: Rambus Inc., San Jose, CA (US)

(72) Inventors: Craig E. Hampel, Los Altos, CA (US); Liji Gopalakrishnan, Sunnyvale, CA (US); John Eric Linstadt, Palo Alto, CA (US); Steven C. Woo, Saratoga, CA (US)

(73) Assignee: Rambus Inc., San Jose, CA (US)

( * ) Notice: Subject to any disclaimer, the term of this patent is extended or adjusted under 35 U.S.C. 154(b) by 23 days.

(21) Appl. No.: 16/997,661

(22) Filed: Aug. 19, 2020

(65) Prior Publication Data
US 2021/0064788 A1 Mar. 4, 2021

Related U.S. Application Data

(60) Provisional application No. 62/895,649, filed on Sep. 4, 2019.

(51) Int. Cl.
*G06F 21/75* (2013.01)
*H04L 9/00* (2022.01)
*G06F 12/14* (2006.01)
*G06F 21/60* (2013.01)
*G06F 3/06* (2006.01)

(52) U.S. Cl.
CPC ............ *G06F 21/755* (2017.08); *G06F 3/062* (2013.01); *G06F 3/0659* (2013.01); *G06F 12/1441* (2013.01); *G06F 21/60* (2013.01); *H04L 9/003* (2013.01)

(58) Field of Classification Search
CPC .... G06F 21/755; G06F 12/1441; G06F 21/10; G06F 3/0655; H04L 9/003
See application file for complete search history.

(56) References Cited

U.S. PATENT DOCUMENTS

| | | | |
|---|---|---|---|
| 7,222,224 B2 | 5/2007 | Woo et al. | |
| 7,412,579 B2* | 8/2008 | O'Connor | G06F 12/1441 |
| | | | 711/163 |
| 2005/0097341 A1* | 5/2005 | Francis | G06F 21/10 |
| | | | 713/189 |
| 2016/0034216 A1 | 2/2016 | Chun et al. | |
| 2017/0060788 A1* | 3/2017 | Chang | G06F 13/4068 |

(Continued)

OTHER PUBLICATIONS

"Strong and Efficient Cache Side-Channel Protection using Hardware Transactional Memory"—Gruss et al., Graz University of Technology, University of California, Irvine, & Microsoft Research, Aug. 18, 2017 https://www.usenix.org/system/files/conference/usenixsecurity17/sec17-gruss.pdf (Year: 2017).*

(Continued)

*Primary Examiner* — Randy A Scott
(74) *Attorney, Agent, or Firm* — Lowenstein Sandler LLP (57) ABSTRACT

Methods and systems for enabling secure memory transactions in a memory controller are disclosed. Responsive to determining that an incoming request is for a secure memory transaction, the incoming request is placed in a secure request container. The memory container then enters a state where re-ordering between requests for secure memory transactions placed in the secure request container and requests for non-secure memory transactions from other containers is prevented in a scheduling queue.

20 Claims, 5 Drawing Sheets

(56) References Cited

U.S. PATENT DOCUMENTS

2019/0095334 A1\* 3/2019 Shanbhogue ....... G06F 12/1475
2019/0384501 A1\* 12/2019 Jagtap ................... G06F 3/0655

OTHER PUBLICATIONS

""Scheduling, Isolation, and Cache Allocation A Side-Channel Defense"—Spraybery et al., University of Illinois & Oregon State" https://sibin.github.io/papers/2018_IC2E_CacheSideChannel-ReadSprabery.pdf (Year: 2018).\*

\* cited by examiner

SECURING ADDRESS INFORMATION IN A MEMORY CONTROLLER

RELATED APPLICATIONS

This application claims the benefit under 35 U.S.C. § 119(e) of U.S. Provisional Application 62/895,649 filed on Sep. 4, 2019, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to prevention of memory access leakage (e.g., timing and location information) in a memory controller integrated circuit (IC) device. Memory access leakage can occur when a memory controller (MC) schedules requests for memory transactions (e.g., a request for a read operation, and/or a write operation) from one or more processors directed to various physical memory units (also called storage cells) residing in various segments of a memory (also called a memory system). The memory controller resides between the processor(s) initiating the requests and the memory that stores/reads the requested data.

The memory may comprise a shared data storage resource accessed by a plurality of computer processors initiating requests for various memory transactions. Note that the term "processor" encompasses processing cores in case of a multi-core processor. An example of a processing core is a crypto-core used for executing a cryptographic algorithm.

Each physical memory unit has a corresponding address space, and the incoming requests initiated by the processors (also referred to herein as "agents") specify the addresses pertaining to the requested memory transactions. Typically, incoming requests are stored or queued in the memory controller and then reordered to improve the efficiency of the memory system or to satisfy specific requirements (like latency or throughput) of the memory system or the workload being requested by the agent. However, if the memory controller can determine that an incoming request is initiated by a secure agent (i.e., an agent that requests a secure transaction), then the memory controller can change the policy of scheduling the incoming requests. Sensitive information may include, for example, a location of a secure data structure, i.e., memory addresses of the physical memory units where the secure data structure is stored. A non-limiting example of a secure data structure is a key table listing values of encryption/decryption keys. The key values may have been requested by a secure agent.

If secure memory transactions are re-ordered around non-secure memory transactions in a scheduling queue in the memory controller based on memory addresses, then timing of accessing certain physical memory units having certain specified addresses also changes. Security threats (such as, malwares) can exploit these memory access timing differences via an attack on a communication path between a computer processor (e.g., a central processing unit (CPU)) and the external memory. The memory controller scheduling queue comprises part of the communication path subjected to this malicious attack. Side Channel Attack (SCA) is one such type of malicious attack commonly used by security threats to glean sensitive information.

Aspects of the present disclosure enable a secure path in the memory controller for the secure memory transaction requests, while minimizing performance impact on non-secure memory transaction requests. Since non-secure memory transaction requests constitute the majority of incoming requests received by the memory controller, minimizing performance impact on non-secure memory transaction requests elevates overall performance of the memory controller serving multiple agents. The secure path in the memory controller is resistant to SCA or other types of malicious attacks from agents using the non-secure path, because the memory access timing information is obscured by preventing address dependent re-ordering between secure and non-secure transactions in a scheduling queue. Note that even if secure transactions are reordered with non-secure transactions, the re-ordering is not based on sensitive information, e.g., physical memory address information about location of a secure data structure. The scheduling queue implements a special policy when secure memory transactions are included in the scheduling queue. One example of a special policy is a closed page policy for a Dynamic Random Access Memory (DRAM)-based memory. A closed page policy means that the memory controller always closes a memory page by sending an explicit or auto precharge command after the requested memory transaction is performed (e.g., a read or write request initiated by the agent is serviced). Though implementing a closed page policy increases transaction latency (i.e., time lag between receiving request for transaction and completing the request) compared to an open page policy (where the memory page remains open to receive the next read or write request once the previous request is serviced), applying the closed page policy to a scheduling queue having both secure and non-secure transaction requests ensures resistance against SCA. Note that closed page policy involves closing all open pages or return them to their original state after a secure memory transaction. It may not be required to close all pages or close pages between consecutive secure or consecutive non-secure memory transactions.

One advantage of the techniques of this disclosure is the flexibility in implementing an appropriate policy on a scheduling queue depending on whether a secure memory transaction is included in the scheduling queue, rather than applying fixed latency (e.g., a maximum latency value allowed by system constraints) universally even when no secure request is included in the scheduling queue. Another advantage of the techniques of this disclosure is that a plurality of secure agents can share dedicated memory resources and use the same policy to obscure memory access timing information, as described with reference to FIG. 3 below.

Figure 1:
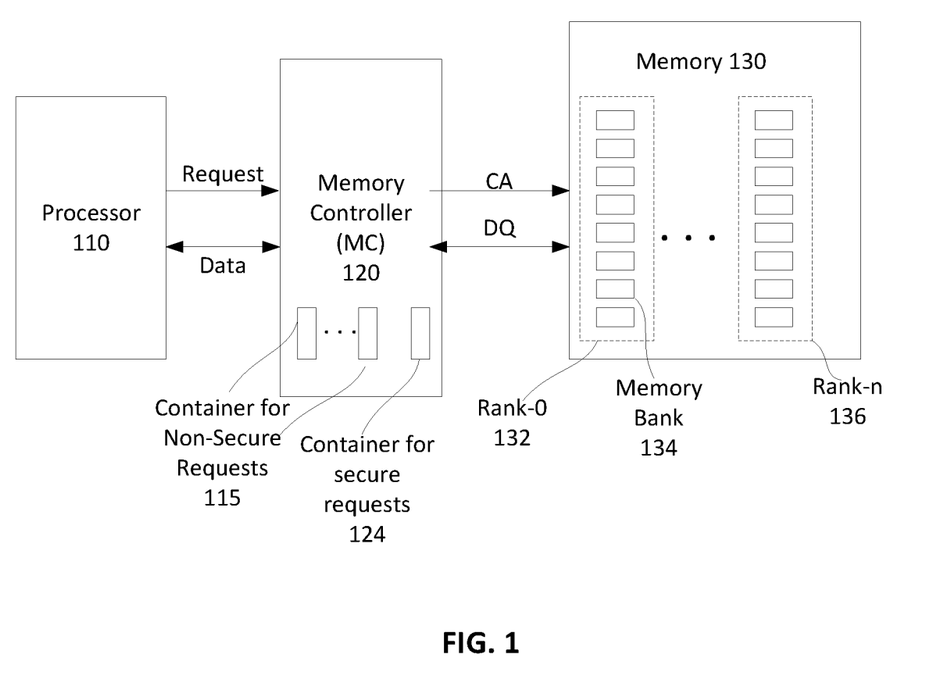
FIG. 1 is a block diagram of a simplified system with a memory system controlled by a memory controller that receives requests from a processor, in accordance with some aspects of the disclosure.

FIG. 1 illustrates a block diagram of a simplified system with a memory system controlled by a memory controller that receives requests from a processor, in accordance with some aspects of the disclosure. The processor 110 may be a Central Processing Unit (CPU) having one or more processing cores. The memory system 130 may comprise data storage resource accessed by the processor 110. The memory controller 120 schedules incoming requests from the processor 110. The incoming requests may be for secure memory transactions or for non-secure memory transactions depending on whether the processor is a secure agent or a non-secure agent. Note that a processor can operate both as a secure agent or a non-secure agent by determining if it is executing specific code that is intended to be secure. ARM Trustzone is an example of a processor acting as both a secure and non-secure agent. The memory controller may be integrated on the same die as the processors or be part of a separate chip. The memory system 130 may have a plurality of memory components, each having a plurality of addressable memory banks 134. The plurality of memory components may be arranged in a plurality of ranks (Rank-0, . . . , Rank-n), each rank (e.g., rank 132 and rank 136) denoting a group of memory components that share a common command and address bus (denoted as CA in FIG. 1). A rank can indicate a logical collection of memory addresses. An example of memory system is Dual In-Line Memory Module (DIMM), where there are two memory ranks. A rank may be composed of a single memory component. In FIG. 1, DQ denotes a data bus, which may be bi-directional, i.e. both transmitting data and receiving data are supported on the same physical wires. In the memory controller 120, requests directed to memory addresses in a particular rank may be assigned to a container for that rank. Containers are logically separate from each other, though a scheduling queue may have requests coming from a plurality of agents. Memory controller 120 may have a container 124 for incoming requests for secure transactions. Memory controller 120 may also have one or more containers 115 for incoming requests for non-secure transactions directed to the memory addresses in ranks (Rank-0, . . . , Rank-n) in the memory system 130. It is also common for memory controllers to separate the requests that write data from those that read data and modify the priority and order between and within them. This concept is elaborated further with respect to FIG. 2 that also shows memory controller 120 and memory system 130. Note that in FIG. 2, the memory controller 120 may have been implemented as an IC (also called a memory controller chip).

In one embodiment, a memory system may be based on Dynamic Random Access Memory (DRAM) memory components. Each memory component comprises multiple banks each having a two-dimensional (2D) array of physical memory units (i.e. storage cells) arranged in multiple rows and columns. Each bank also has row decoders, column decoders, sense amplifiers, and may have other peripheral circuits.

Figure 2:
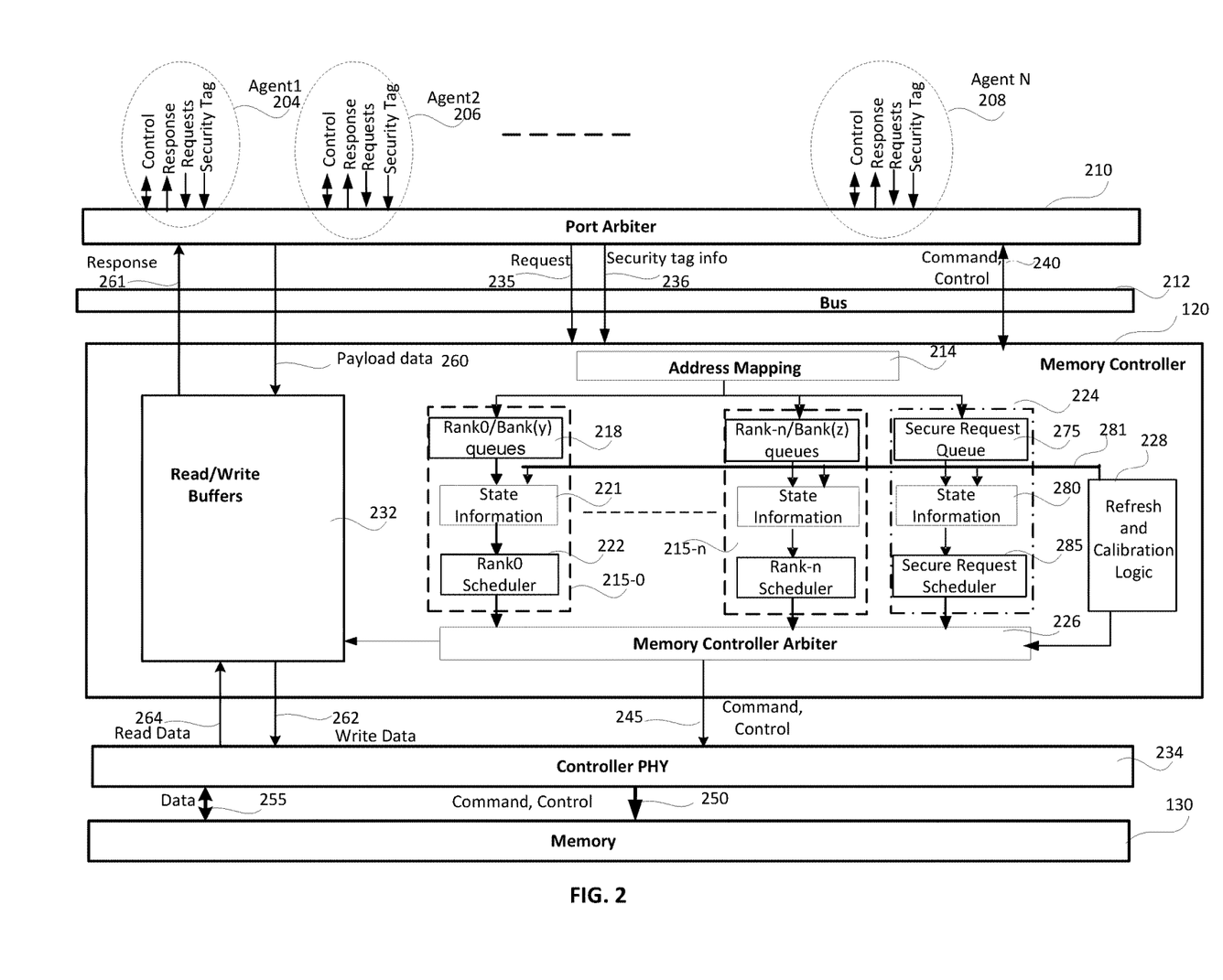
FIG. 2 is an example implementation of a memory controller to enable secure transactions without being vulnerable to side channel attack (SCA).

FIG. 2 illustrates an example embodiment of a memory controller 120 that enables secure transactions without being vulnerable to address side channel attack (SCA). Memory controller 120 implements scheduling policies for incoming requests in a manner that is resistant to SCA. Memory controller 120 serves multiple agents (i.e. Agent 1, . . . , Agent N), some of which may be secure agents. A secure agent is typically allocated trusted, non-shared address space in the shared external memory space. Allocating a dedicated non-shared physical memory resource such as a memory bank for a secure agent may not be an efficient utilization of the shared memory resources, as the bulk of the incoming requests come from non-secure agents which cannot utilize the capacity of the non-shared physical memory resource.

Signals coming from the agents (e.g., agents 204, 206 and 208) include control signals, and requests, and signals going to the agents include control signals and responses to the requests. Both command and acknowledgment of the command may be transmitted between an agent and the memory controller via the same physical path. In addition, the incoming requests may be associated with a security tag that indicates whether an incoming request is for a secure memory transaction or a non-secure memory transaction. The security tag value may be set to '1' if the requested transaction is secure. A security tag value of '0' may indicate that the requested transaction is non-secure.

A port arbiter 210 may be interposed between the agents and the memory controller 120. An arbiter is an electronic device or circuit that allocates access to shared resources. In FIG. 2, the port arbiter 210 may allocate different resources of the memory system 130 to receive incoming requests from different agents, and may route the requests as a consolidated request 235 (which may retain the initiating agent's identity) to memory controller 120. A bus 212 (which may be a crossbar outside the memory controller 120) can route the payload data 260 towards read/write buffers 232 and can route information about the memory addresses in the incoming requests to various paths within the chip including to the memory controller. Details of the read/write buffers 232 are omitted for simplicity. On a high level, if the incoming request is for a write operation, write data 262 is transmitted to the specified addresses within the memory system 130 via a physical layer interface 234 of the controller (denoted as controller PHY). If the incoming request is for a read operation, read data 264 retrieved from the specified addresses within the memory system 130 is received via the physical layer interface 234 and routed to the requesting agents through the port arbiter 210. Response 261 going to the port arbiter 210 from the read/write buffers 232 may include a confirmation that a write operation has been completed, stored in the memory controller, or may include data requested by the agents in a read operation.

Within the memory controller 120, an address mapping block 214 may map incoming requests to various paths based on addresses specified in the respective incoming requests. The port arbiter 210 in FIG. 2 passes along requests 235 and the security tag information 236 coming from the requesting agents to the memory controller 120, so that the memory controller 120 is informed of the security tag information while queuing the requests to the various paths directed to memory addresses in various corresponding ranks. All requests, responses and command and control signals (e.g., signal 240) pass via bus 212 from port arbiter 210 to memory controller 120.

The security tag information 236 may be communicated to the memory controller by various means, including, but not limited to the following: sideband information in the incoming request, a header field in the incoming request, or, an identification of a source that originated the incoming request or the security property can be identified by the memory controller based on the address received. For example, the sideband information may include identification information for a trusted zone (i.e. a secure execution environment), indicating that the incoming request is for secure information initiated by a processor in the trusted zone. This identification information may also be included in the header field outside of the payload data portion of a command. Alternatively, each secure processor may have an agent identification number, so that every request coming from those agents automatically sets the security tag value to be '1'. In another alternative embodiment, the security tag may be set to '1' if the incoming request includes a secure aperture, e.g., each memory address within the aperture (i.e., a range of memory addresses) is dedicated to store secure data.

The various paths within the memory controller 120 may be implemented as containers separate and distinct from each other. Each path/container may implement its own scheduling schemes to set the order of requests directed to addresses in a particular rank or bank. A plurality of paths may implement the same scheduling scheme too. Each path/container may be associated with a particular logical collection of memory addresses. For example, path 215-0 may be designated to incoming requests with addresses belonging to rank0 and bank(y) (or a subset of bank(y)), and path 215-n may be designated to incoming requests with addresses belonging to rank-n and bank(z) (or a subset of bank(z)), with other paths designated to other ranks in between. Each path comprises a respective container with rank queues 218 for incoming requests for a particular rank, a state information block 221 that maintains information about current state of each bank (and/or each memory unit within that bank) within that particular rank, and a scheduler block 222 that schedules the incoming requests for that particular rank into a sequence according to an applicable scheme. Note that even if rank schedulers are shown within respective containers, a scheduling queue may comprise requests from a plurality of containers. A refresh and calibration logic block 228 may maintain information about the current states of the banks for respective ranks. The logic block 228 may also initiate the opening or closing of particular rows within each bank using the applicable command (such as an activation command or a precharge command, discussed further below) via the controller physical layer (PHY) interface 234. The requests in queues for each rank may be routed to a memory controller arbiter 226, which sends the command and control signal 245 associated with the scheduling queue (having requests directed to different ranks) to the memory system 130 via the controller physical layer PHY interface 234 (which sends command and control signal 250 to memory system 130, and has a bidirectional data path 255).

In order to achieve resistance against SCA, memory controller 120 in FIG. 2 implements a dedicated secure request container 224 (a secure path segregated either logically or physically from other paths within the memory controller) for the incoming requests for secure transactions (also referred to as "secure requests"). Container 224 comprises a secure request queue 275, a state information block 280 that maintains information about current state of memory addresses associated with the secure requests, and a scheduler block 285 that arranges or schedules the secure requests into a sequence according to an applicable scheme. State information is shared among the different containers (221, 280 etc.) and the logic block 228 via bus 281 so that re-ordering between secure requests and non-secure requests is prevented. Some implementations of this process are discussed in further detail with respect to FIGS. 3 and 4.

Figure 3:
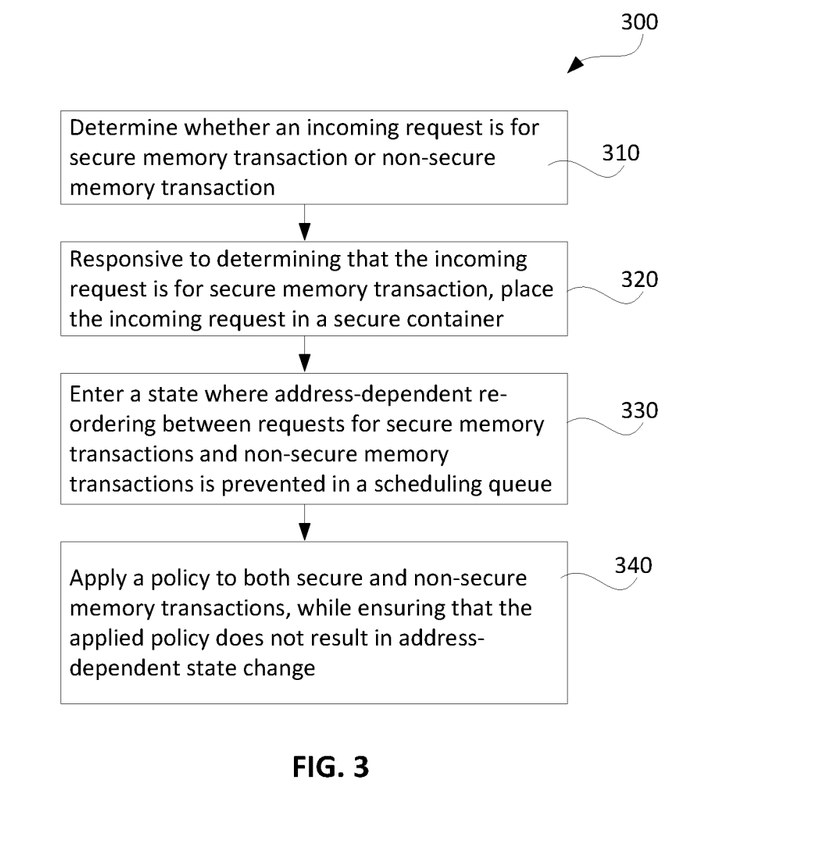
FIG. 3 is a flow diagram of an example method describing operations of a memory controller that handles both secure and non-secure memory transactions, according to an embodiment of the present disclosure.

FIG. 3 is a flow diagram of an example method 300 to perform a secure memory transaction, in accordance with some aspects of the present disclosure. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by a processor (not shown) in the memory controller 120 shown in FIG. 2.

At operation 310, the processor in the memory controller determines whether an incoming request is for a secure memory transaction or for a non-secure memory transaction. Secure memory transaction may be identified when a security tag is set to a first value (e.g., '1') and a non-secure memory transaction may be identified when a security tag is set to a second value (e.g., '0'). The security tag value may be part of the incoming request received by the memory controller.

At operation 320, responsive to determining that the incoming request is for a secure memory transaction, the memory controller places the incoming request in a secure request container. Other blocks, e.g., a flow control block (not shown) may work in conjunction with the bus and the address mapping block to place the incoming secure requests in a secure request container. Other non-secure requests may be placed in a plurality of containers separate from the secure request container. For example, in FIG. 2, containers 215-0 through 215-n may be for non-secure requests only, while container 224 is for secure requests. When a scheduling queue has incoming requests from the secure request container, a special policy (such as disabling reordering between containers)) may be implemented.

At operation 330, responsive to determining that the incoming request is for a secure memory transaction, the memory controller enters a state where address-dependent re-ordering between requests for secure memory transactions and requests for non-secure memory transactions is prevented in a scheduling queue. In an embodiment, the state information shared via bus 281 is used to select appropriate scheduling policy (e.g. the policy of disabling reordering between containers, and/or closed page policy). Note that re-ordering between a plurality of non-secure requests or a plurality of secure requests may be allowable but re-ordering between secure and non-secure requests would be prohibited. Prohibiting re-ordering between secure and non-secure requests masks memory access timing information targeted by SCA to determine location of secure data.

At operation 340, the memory controller applies a policy to a scheduling queue having requests for both secure and non-secure transactions, while ensuring that the applied policy does not result in address-dependent state change in a memory page. A memory page refers to a plurality of memory cells with the same row address. In an embodiment, a closed page policy may be applied to the scheduling queue. A closed page policy means that the memory controller always closes a memory page by sending an explicit precharge or auto-precharge command after the requested memory transaction is performed (e.g., a read or write request initiated by the agent is serviced). In addition to preventing re-ordering of secure and non-secure requests, applying the closed page policy to both secure and non-secure transaction requests in a scheduling queue can bolster resistance against SCA. The closed page policy should not result in address-dependent state change in page state.

Specifically, in order to implement a closed page policy for a secure read transaction, the memory controller can send an activate command to open a row in an addressed memory bank. Following the activate command, the memory controller can send the read command with the column address for a column access in the addressed memory bank. Upon receiving the read command, the memory rank can return the appropriate data after a read latency (typically 15-30 ns). The memory controller can then issue a command to precharge the row that is open in the bank, so that the row closes. Note that the precharge command may be explicit or an auto-precharge command. For a secure write transaction, the precharge command is intended to close a row after data is written at the designated address specified in the secure write request. In essence, after each read/write transaction, the memory page is closed, and a new memory page has to be opened for the next read/write transaction.

The memory controller 120 of this disclosure can also support an open page policy, especially for a scheduling queue having only non-secure transactions. In an open page policy, the memory controller does not close a row/page immediately after a read/write transaction is completed. A row is left open in a bank so that a command to another column in the same row can be sent without needing to issue an additional activate command, since the data is already available in the sense amplifiers of a memory bank. Therefore, consecutive read/write transactions can be performed faster when an open page policy is implemented in a scheduling queue compared to when a closed page policy is implemented in the same scheduling queue. However, the closed page policy results in improved resistance against SCA.

Figure 4:
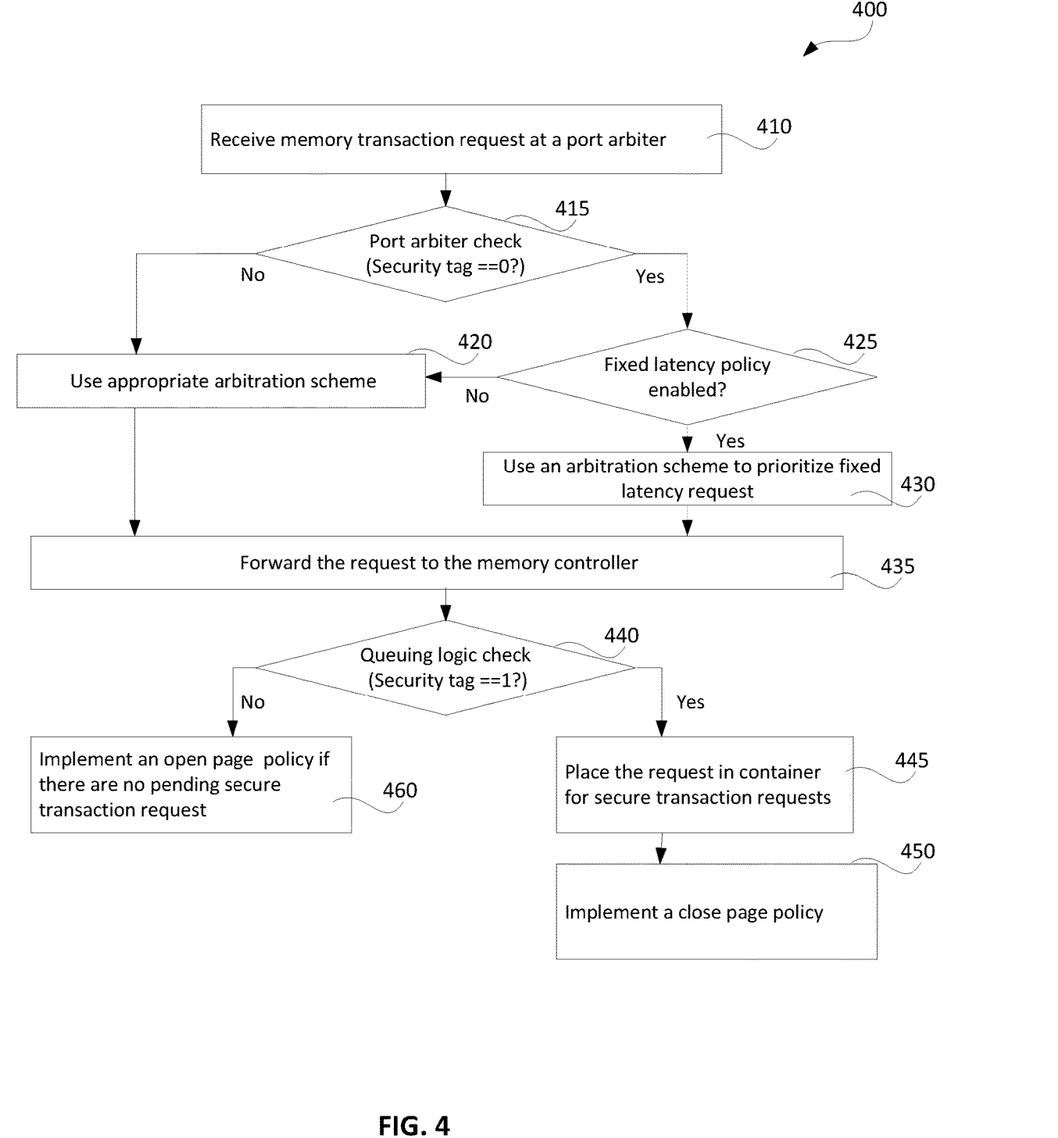
FIG. 4 is a flow diagram of an example scheduling sequence that can implement a closed page policy or an open page policy, in accordance with some embodiments of the present disclosure.

FIG. 4 is a flow diagram of an example scheduling sequence (method 400) that implements a variety of scheduling policies for incoming requests (including a closed page policy for secure requests), in accordance with some embodiments of the present disclosure. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by a port arbiter 210 and a memory controller 120 shown in FIG. 2.

At operation 410, a port arbiter (e.g., port arbiter 210 shown in FIG. 2) receives a memory transaction request. The incoming requests come from one or more agents, some of which may be secure agents initiating requests for a secure transaction ("secure request"). The port arbiter may support a variety of arbitration schemes, e.g., round robin, strict priority, weighted priority etc.

At operation 415, memory controller checks for or determines a value of a security tag associated with the incoming request. As discussed above, the security tag can be set to a first value (e.g., '1') or a second value (e.g., '0'). If the security tag has a second value (e.g., value 0), then the port arbiter performs a further check for latency at operation 425. If a fixed latency policy is enabled, then the port arbiter uses an appropriate arbitration scheme to prioritize fixed latency request (at operation 430). If the security tag is not equal to the second value (e.g., value 0), the port arbiter interprets the incoming request to be a potential secure request, and uses an arbitration scheme selected by the user/memory controller (at operation 420), bypassing the fixed latency check operation 425. In an embodiment, the controller is configured to avoid applying the fixed latency policy universally to all incoming requests (secure and non-secure requests) in order to expedite non-secure transactions while not divulging memory access timing information. Note that the security tag value checked by the port arbiter at operation 415 may be included in sideband information, or, in the header, as discussed above.

At operation 435, the port arbiter forwards the incoming request to the memory controller. The memory controller may perform another round of logic check at operation 440. In an embodiment, queuing logic check may be performed by the address mapping block 214. Note that there are alternative ways of determining if an incoming request is for a secure transaction that setting a security tag value that a port arbiter may be able to check. For example, an incoming request directed to a range of trusted addresses in an external memory may return a security tag value of 1 at the queuing logic check operation 440, though the same request may return a value of 0 at operation 415 (port arbiter check). Also, an incoming request may return a value of '1' both at operations 415 and 440.

If at operation 440, the security tag value is determined to have the first value (e.g., '1'), the memory controller interprets the request as a request for secure transaction, and places the incoming request in a secure request container at operation 445.

At operation 450, the incoming secure request is routed to a secure request queue and the memory controller implements a closed page policy for all transactions (secure and non-secure), i.e., after each transaction, a memory page is closed. The state information associated with this scheduling queue also prevents re-ordering between secure and non-secure requests, as described above with reference to FIG. 3.

If at operation 440, the security tag value is not determined to have the first value (e.g., '1'), the memory controller interprets the request as a request for non-secure transaction, and places the incoming request in a scheduling queue that may implement an open page policy (at operation 460). The open page policy (or any other policy that may maximize a memory channel performance by reducing latency compared to a universal fixed latency policy) can be applied to a scheduling queue if all requests in all the scheduling queues came from non-secure containers. Reordering between a plurality of non-secure requests may be allowed to improve overall performance of the memory controller.

In an embodiment, responsive to determining that the incoming request is for a secure memory transaction, the memory controller identifies a memory bank (or rank) having physical memory addresses associated with the secure memory transaction request, and, limits the closed page policy or other policies, as applicable, to the identified memory bank. In an embodiment, the memory controller may save an original state of the identified memory bank including indication of whether the identified memory bank is open or closed. Responsive to determining that the original state of the identified memory bank for the secure memory transaction is open, the memory controller saves the row address of the open row. The memory controller then closes the memory bank if the secure transaction needs to access a different row of the bank, re-opening it with a new row to service the secure memory transaction. The identified memory bank is then returned to the state it was in before the secure memory transaction. This may entail closing the bank after servicing the secure memory transaction, and activating the bank with the row accessed before the secure memory transaction.

Note that, maintenance tasks, such as periodic calibration of memory banks and refreshing memory banks (or certain rows or columns of the memory bank) may continue on all the containers (secure and non-secure), as maintenance operations are not influenced by specific addresses, and hence, not vulnerable to SCA for information leak.

Persons skilled in the art will understand that although the flow diagrams in FIGS. 3 and 4 show a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5:
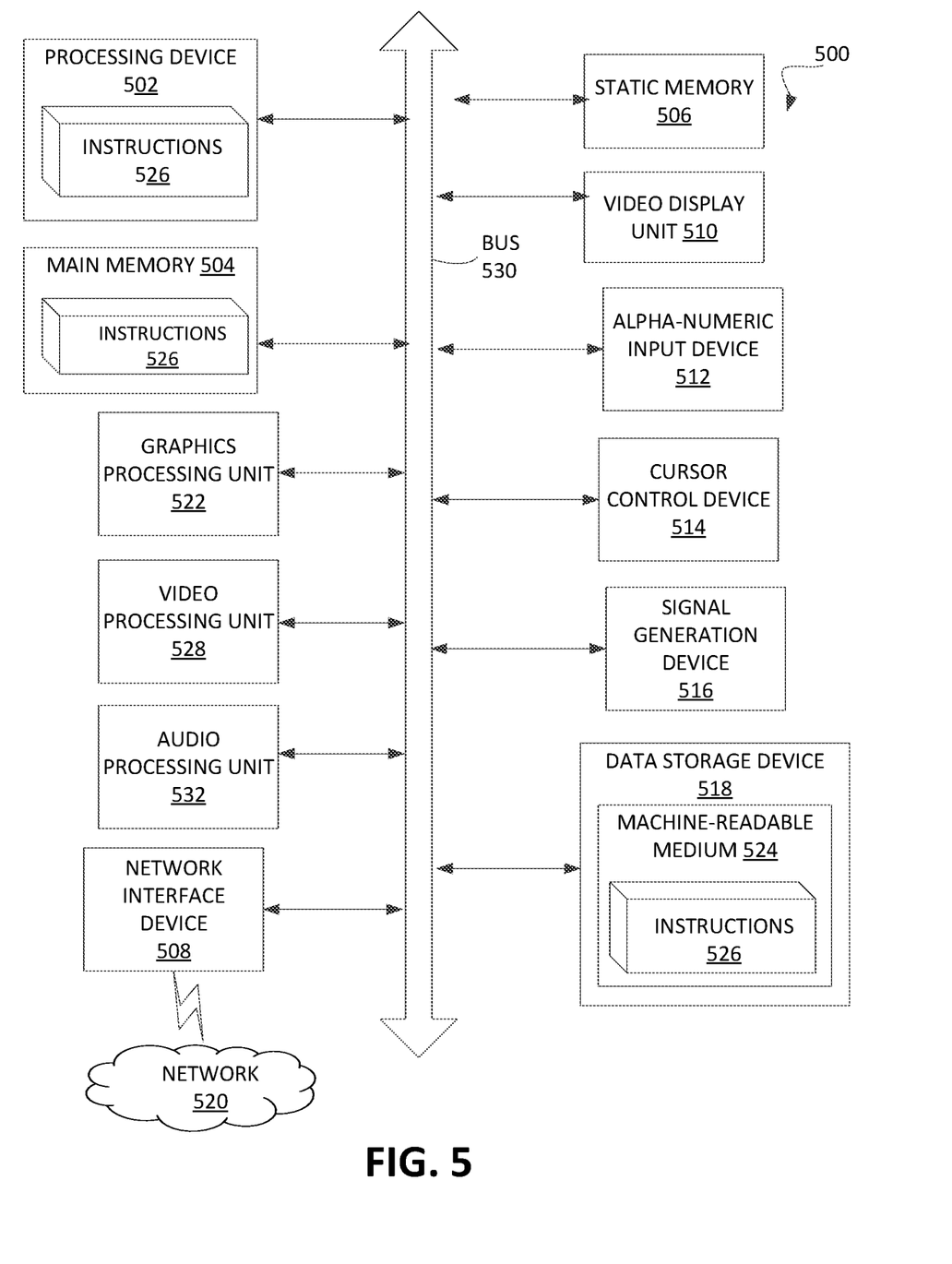
FIG. 5 illustrates a block diagram of a sample computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518 (e.g., memory system 130 shown in FIG. 1), which communicate with each other via a bus 530. In one implementation, processing device 502 may be processor in the memory controller 120 in FIG. 2.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality of the memory controller 120. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for securing address information in a memory controller, the method comprising:
    determining whether an incoming request is for a secure memory transaction or for a non-secure memory transaction;
    responsive to determining that the incoming request is for a secure memory transaction, placing the incoming request in a secure request container;
    detecting that a scheduling queue comprises both requests for secure memory transactions placed in the secure request container and requests for non-secure memory transactions from other containers; and
    responsive to the detection, entering a state where address-dependent re-ordering between requests for secure memory transactions and requests for non-secure memory transactions is prevented in the scheduling queue.

2. The method of claim 1, wherein the method further comprises:
    implementing a closed page policy for both secure memory transactions and non-secure memory transactions in the scheduling queue.

3. The method of claim 1, wherein the scheduling queue is configured to implement memory access based on physical memory addresses in a physical memory segment associated with respective incoming requests.

4. The method of claim 3, wherein the physical memory segment comprises a memory bank.

5. The method of claim 3, wherein the secure memory transaction contains sensitive information targeted by a side channel attack.

6. The method of claim 5, wherein the sensitive information comprises physical memory address information about location of a secure data structure.

7. The method of claim 6, wherein the secure data structure contains information about a cryptographic key.

8. The method of claim 5, wherein the side channel attack uses memory access timing information.

9. The method of claim 8, wherein preventing re-ordering between requests for secure memory transactions and requests for non-secure memory transactions in the scheduling queues prevents divulging the memory access timing information.

10. The method of claim 1, wherein determining whether an incoming request is for a secure memory transaction or for a non-secure memory transaction comprises:
    identifying a security tag in the incoming request.

11. The method of claim 10, wherein the security tag comprises one of the following: sideband information in the incoming request, a header field in the incoming request, or an identification of a source that originated the incoming request.

12. The method of claim 1, wherein determining whether an incoming request is for a secure memory transaction or for a non-secure memory transaction comprises:
    inspecting whether physical memory addresses associated with the incoming request fall within a range of trusted physical memory addresses; and
    responsive to determining that the physical memory addresses associated with the incoming request fall within a range of trusted physical memory addresses, indicating the incoming request to be for a secure memory transaction.

13. The method of claim 2, wherein implementing the closed page policy comprises:
    after receiving the incoming request to perform a memory transaction involving data stored in a memory bank, closing all rows of the memory bank;
    activating a particular row of the memory bank;
    performing the requested memory transaction at a column level in the memory bank; and
    closing the activated row of the memory bank.

14. The method of claim 1, wherein the method further comprises:
    responsive to determining that the incoming request is for a non-secure memory transaction, associating a fixed latency for processing the incoming request irrespective of physical memory addresses associated with the non-secure memory transaction request.

15. The method of claim 2, further comprising:
    responsive to determining that the incoming request is for a secure memory transaction, identifying a memory bank having physical memory addresses associated with the secure memory transaction request; and
    limiting the closed page policy to the identified memory bank.

16. The method of claim 1, further comprising:
    responsive to determining that the incoming request is for a secure memory transaction, identifying a memory bank having physical memory addresses associated with the secure memory transaction request;
    saving an original state of the identified memory bank including indication of whether the identified memory bank is open or close;

responsive to determining that the original state of the identified memory bank for the secure memory transaction is open, saving addresses of open rows;

closing all rows of the identified memory bank;

closing the identified memory bank;

opening the identified memory bank with a new row to service the secure memory transaction;

closing the identified memory bank after servicing the secure memory transaction; and restoring the original state of the identified memory bank.

17. A system for enabling secure memory transactions comprising:

an external memory; and a processor in a memory controller, wherein the processor is coupled with the external memory to perform operations comprising:

determining whether an incoming request is for a secure memory transaction or for a non-secure memory transaction;

responsive to determining that the incoming request is for a secure memory transaction, placing the incoming request in a secure request container;

detecting that a scheduling queue comprises both requests for secure memory transactions placed in the secure request container and requests for non-secure memory transactions from other containers; and responsive to the detection, causing the memory controller to enter a state where re-ordering between requests for secure memory transactions and requests for non-secure memory transactions is prevented in the scheduling queue.

18. The system of claim 17, wherein the operations further comprise:

implementing a closed page policy for both secure memory transactions and non-secure memory transactions in the scheduling queue.

19. The system of claim 17, wherein the secure memory transaction contains sensitive information targeted by a side channel attack.

20. The system of claim 19, wherein the sensitive information comprises physical memory address information about location of a secure data structure.

* * * * *